(12) United States Patent
Pugh (10) Patent No.: US 10,713,547 B2
(45) Date of Patent: Jul. 14, 2020

(54) SYSTEMS, PROCESSES, INTERFACES, AND COMPUTER PROGRAM PRODUCTS FOR VERIFICATION OF IMAGE CONTENT IN SOFTWARE DEVELOPMENT SYSTEMS

(71) Applicant: KYOCERA Document Solutions Inc., Osaka (JP)

(72) Inventor: Eric Pugh, Torrance, CA (US)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 15/786,258

(22) Filed: Oct. 17, 2017

(65) Prior Publication Data

US 2019/0114250 A1  Apr. 18, 2019

(51) Int. Cl.
| | |
|---|---|
| *G06F 9/44* | (2018.01) |
| *G06K 15/02* | (2006.01) |
| *G06F 11/36* | (2006.01) |
| *G06F 11/07* | (2006.01) |
| *G06F 11/30* | (2006.01) |
| *G06F 3/12* | (2006.01) |
| *H04N 1/64* | (2006.01) |

(Continued)

(52) U.S. Cl.
CPC ......... *G06K 15/181* (2013.01); *G06F 3/1245* (2013.01); *G06F 3/1248* (2013.01); *G06F 11/0781* (2013.01); *G06F 11/302* (2013.01); *G06F 11/366* (2013.01); *G06F 11/3664* (2013.01); *H04N 1/603* (2013.01); *H04N 1/642* (2013.01); *G06F 11/3672* (2013.01); *G06K 15/1849* (2013.01); *G06T 11/00* (2013.01)

(58) Field of Classification Search
CPC ..... G06T 11/203; G06T 7/0002; G06T 11/00; G06F 17/5031; G06F 3/1206; G06F 3/1248; G06F 3/1245; H04N 1/648; H04N 1/32352; H04N 1/00204; H04N 1/603; H04N 1/642; G06K 15/12; G06K 15/1849; G06K 15/181; G03B 21/00
See application file for complete search history.

(56) References Cited

U.S. PATENT DOCUMENTS

| | | | | |
|---|---|---|---|---|
| 5,301,267 A | * | 4/1994 | Hassett ................. | G06T 11/203 345/170 |
| 6,344,901 B1 | * | 2/2002 | Simon .................... | H04N 1/648 358/1.1 |

(Continued)

*Primary Examiner* — Tuan A Vu
(74) *Attorney, Agent, or Firm* — L/O Alexis J Saenz (57) ABSTRACT

A system provides verification of image content in software modules within a system of software under development. Embodiments retrieve image data from a software module written in a native or first computer program type or language. The retrieved image data may be evaluated so that a conversion image space is prepared as a new coordinate space that will be used to render the image data into an image object outside of the native computer program type or language. In an exemplary embodiment, a bit-per-pixel value may be applied to the image data during conversion to a second computer program format/language. The converted image data may then be rendered into an image object in the new coordinate space according to the new readable format. The rendered image object may then be displayed to provide convenient and quick visual verification of the accuracy of the unrendered image data content.

18 Claims, 4 Drawing Sheets

(51) Int. Cl.
*H04N 1/60* (2006.01)
*G06T 11/00* (2006.01)

(56) References Cited

U.S. PATENT DOCUMENTS

| | | |
|---|---|---|
| 9,164,874 B1 | 10/2015 | Tomay et al. |
| 9,288,360 B1 * | 3/2016 | Dennison ............ H04N 1/32352 |
| 2003/0126565 A1 * | 7/2003 | Aldebert ............. G06F 17/5031 |
| | | 716/102 |
| 2003/0214668 A1 * | 11/2003 | Roylance ............... G06K 15/12 |
| | | 358/1.15 |
| 2004/0066527 A1 | 4/2004 | Kloosterman et al. |
| 2006/0256358 A1 * | 11/2006 | Chapman .............. G06F 3/1206 |
| | | 358/1.13 |
| 2011/0188084 A1 * | 8/2011 | Ohishi ............... H04N 1/00204 |
| | | 358/1.16 |
| 2014/0022235 A1 * | 1/2014 | Hajjar .................... G03B 21/00 |
| | | 345/418 |
| 2015/0188977 A1 * | 7/2015 | Berry .................... G06T 7/0002 |
| | | 709/217 |

\* cited by examiner

SYSTEMS, PROCESSES, INTERFACES, AND COMPUTER PROGRAM PRODUCTS FOR VERIFICATION OF IMAGE CONTENT IN SOFTWARE DEVELOPMENT SYSTEMS

CROSS-REFERENCE TO RELATED APPLICATION

None.

FIELD

The subject disclosure relates to image processing and more particularly to systems, processes, interfaces, and computer program products for verification of image content in software development systems.

BACKGROUND

Imaging systems and the software associated with imaging systems sometimes requires multiple team members working on various parts of a project system. As is common in software development, the different parts of the system may not always behave according to plan when various modules are interfaced. As is well-known in software development, much time is spent on debugging lines of code, whether it is performed manually or by automated tools. However, many times the result of data content problems are not seen until a software system is benchmarked and simulations are run. At which time, if expected images are not produced, it may require extensive labor and time to troubleshoot the source(s) of error in the data content.

Considering that sources of error may arise from multiple software modules within the system being verified, fixing one module may not necessarily result in a fix to the expected output. The below further explains how in a real-world setting, software modules depend on the accuracy of content from other modules, which may not be ready for testing. Thus, a subject software module may be tested in a simulation with software stubs with assumed correct content being temporarily substituted in for live, tested software modules. As may be expected, working with assumed correct content does not necessarily mean that image content in a software module being developed is indeed accurate when the subject software module and overall system is placed into live testing. Thus, the problems associated with troubleshooting each nodular part of the system remains.

As can be seen, there is a need to improve on the manner in which imaging system software system content is verified at the software module level prior to system testing.

SUMMARY

In one aspect of the disclosure, a method of verifying image content within a system of software modules comprises retrieving from a memory storage device, a file including unrendered image data written in a first format of a first computer program type; and running an image processing set of instructions of a second computer program type on the unrendered image data. The image processing set of instructions are configured to: determine an image coordinate space compatible with the second computer program type, apply a bit-per-pixel value to the unrendered image data, convert, based on an image operator, the unrendered image data with the applied bit-per-pixel value, into a format readable by the second computer program type, and render a visual image object from the converted image data, the visual image object filling the determined image coordinate space. In addition, the method comprises displaying the rendered visual image object for visual verification of the unrendered image data in the file.

In another aspect, a computer program product for verifying image content within a system of software modules comprises a non-transitory computer readable storage medium having computer readable program code embodied therewith. The computer readable program code is configured to: retrieve from a memory storage device, a file including unrendered image data written in a first format of a first computer program type and run an image processing set of instructions of a second computer program type on the unrendered image data. The image processing set of instructions are configured to: determine an image coordinate space compatible with the second computer program type, apply a bit-per-pixel value to the unrendered image data, convert, based on an image operator, the unrendered image data with the applied bit-per-pixel value, into a format readable by the second computer program type, and render a visual image object from the converted image data, the visual image object filling the determined image coordinate space. The computer readable program code is also configured to display the rendered visual image object for visual verification of the unrendered image data in the file.

In yet another aspect, an image rendering computing device comprises a memory module; an electronic display; an input/output port; and a processor in communication with the electronic display, the memory module, and the input/output port. The processor is configured, via a set of executable instructions stored in the memory module, to: retrieve from the memory module, a file including unrendered image data written in a first format of a first computer program type; run an image processing set of instructions of a second computer program type on the unrendered image data. The image processing set of instructions is configured to: determine an image coordinate space compatible with the second computer program type, apply a bit-per-pixel value to the unrendered image data, convert, based on an image operator, the unrendered image data with the applied bit-per-pixel value, into a format readable by the second computer program type, and render a visual image object from the converted image data, the visual image object filling the determined image coordinate space. The processor is also configured to display the rendered visual image object on the electronic display for visual verification of the unrendered image data in the file.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details Like or similar components are labeled with identical element numbers for ease of understanding.

As will be appreciated, embodiments disclosed below may be practiced in and have industrial applicability to the general fields of image processing.

Generally, embodiments of the subject technology improve the reliability of system verification in software development environments. Software development usually involves the creation of more than one module that will be plugged into operation with multiple other modules in a system under development. The development process may involve many developers working on separate modules. The content of each module being developed is typically distinct from each other module but related so that the content of different modules communicates with other modules and forms an overall software system. To verify a module will operate as expected within the system, modules need to be test run against each other to verify that the content from one module produces content that will operate with a presumed effect in another module. However, each software module typically has a different completion date than other modules, so some modules may not be ready for use by or for reference by other software modules that need to be tested for operability.

To proceed with development, software stubs may be used and substituted for the missing modules in order to simulate the missing content. To determine the correct system behavior, the common practice is to collect data at key points from modules within the system. When the expected behavior of a module agrees with the pre-collected data, the module is considered checked-out or verified. In imaging systems, it is significant that the output of a module checks out or the inaccurate image data may propagate down the system line producing various effects on an image(s). However, there are problems with trying to verify the output of image data during software development. Image data in software modules is written in code similar to the accompanying non-image data. To verify image data accuracy under current approaches requires for example, the user to review the code. However, there is no assurance that the image data is correct until the code is benchmarked. If a developer is using software stubs, the image data may be assumed to be accurate so that the simulated missing content allows another module under review to operate. As may be understood by this approach, if the missing image data being simulated is actually not verifiable, then the software system may actually not operate as expected once missing modules are integrated into the system.

To illustrate a real-world example where the above problems are encountered let us take a look at the processing of portable document format (PDF) files. A page description language uses high-level constructs to specify the appearance of a printed page. If the goal of a project is to build software modules capable of processing a PDF file, one of the tasks involved would be the handling of image objects. When an image object is processed, the high-level PDF constructs are converted to image objects, which are then passed to other modules that handle image data. At the interface between the modules the image data being transferred should be validated against the expected results.

The following is an example of raw image data being transferred across the interface of two modules. One example of raw image data is presented below for an image with 8 pixels by 8 lines, which represents a checker board pattern:

"0xaa, 0x55, 0xaa, 0x55, 0xaa, 0x55, 0xaa, 0x55", where "0xaa"="white, black, white, black, white, black, white, black", and "0x55"="black, white, black, white, black, white, black, white". The data is read from the bottom of the checkerboard up, and from left to right.

The first hexadecimal value above, "0xaa" can be expressed in binary form as

"1 0 1 0 1 0 1 0"

The second hexadecimal value above, 0x55 can be expressed in binary form as

"0 1 0 1 0 1 0 1"

Thus, accordingly, the line "0xaa, 0x55, 0xaa, 0x55, 0xaa, 0x55, 0xaa, 0x55" would generate the following cell format (again, read going from the bottom cell up, and from left to right):

"white, black, white, black, white, black, white, black"
"black, white, black, white, black, white, black, white"
"white, black, white, black, white, black, white, black"
"black, white, black, white, black, white, black, white"
"white, black, white, black, white, black, white, black"
"black, white, black, white, black, white, black, white"
"white, black, white, black, white, black, white, black"
"black, white, black, white, black, white, black, white"

When passing the image data between software modules, a typical method of collecting data to perform system verification would be to send the image data above to the printer backchannel. When captured the data might resemble something like the code below:

```
"Image_data:
0xaa, 0x55, 0xaa, 0x55, 0xaa, 0x55, 0xaa, 0x55
Image_dimensions_x: 8
Image_dimensions_y: 8
Image_bpp: 1"
```

As can be seen, while the above data capture provides an accurate representation of the image being processed by the software module, it does not provide the implementer with a representation that is easy to verify. The data capture is written in the code being implemented for the system being developed. Being image data, if one element of the code is inaccurate, the image object produced will be incorrect.

Over several lines of code, it is a difficult and time-consuming task to audit every line manually to verify the module operates in the system as expected.

As will be appreciated, aspects of the embodiments disclosed below provide improved system verification by converting the pre-collected data to be compatible with a second type of software code that is different than the code (software language) being used for the module/system being developed. The converted form of the pre-collected data may be processed by the second type of software code to generate an image that can be visualized confirming a module's verification status for operation. Likewise, if the behavior of the image displays unexpected results, elements of the generated image may provide clues as to parts of the software module that may need to be reviewed.

For the following flowcharts, steps of the processes may be referred to as blocks and/or by reference numeral shown in parentheses. As will be described further below, steps may be performed by a machine, for example, a computing device. While the steps may be described in one order, it will be understood that variations to the order may be practiced or the order in which claims below are written may vary from the following without departing from the scope of the invention.

Figure 1:
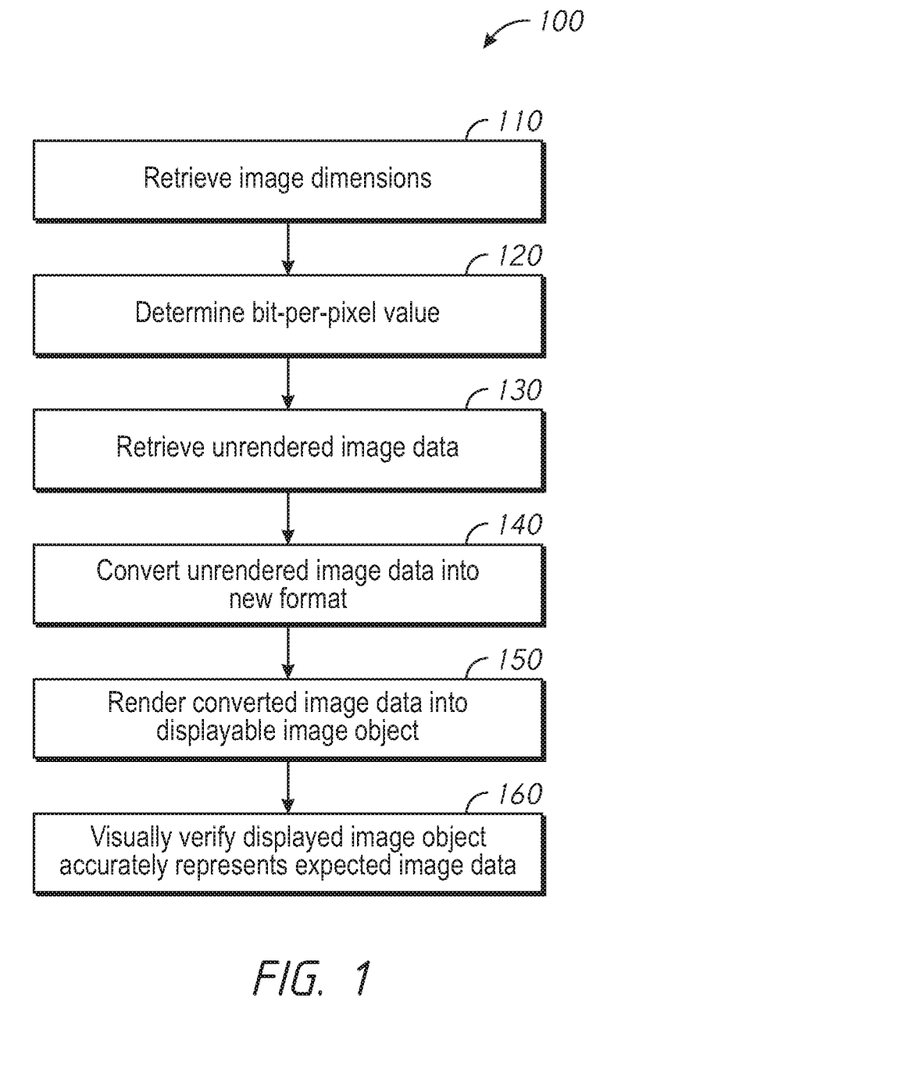
FIG. 1 is a flowchart of a method of converting data captured from a software module within a system under development into a rendered image for visual verification in accordance with an embodiment of the subject technology.

Referring now to FIG. 1, a method 100 of verifying image content within a system of software modules is shown according to an exemplary embodiment. The image content may be retrieved from unrendered image data (software code) representing an image object in a software module being developed and evaluated for operability within a system. The software module being evaluated may be written in a first computer programming language (sometimes referred to as a first computer program type) which is the native language or format of the software module being developed. For example, the image data may comprise VHSIC Hardware Description Language (VHDL) data in a system designing large scale integrated circuits where many parts of the integrated circuit are designed separately from each other. As different portions of the integrated circuit are designed separately, it will be appreciated that being able to check whether a module dedicated to a portion of the circuit is designed correctly by its image is immensely valuable in saving time and expense. However, rendering an image in VHDL before the design code is finished is impractical because it requires additional steps of compiling and simulating. Without the other modules representing other parts of the design being ready, simulation of VHDL image data for one module may be premature. For sake of illustration, the raw or unrendered image data used for examples will refer to the following line of hexadecimal code:

"0xaa, 0x55, 0xaa, 0x55, 0xaa, 0x55, 0xaa, 0x55"

In response to a request for evaluation, the software module may be retrieved from computer storage or memory. In setting up unrendered image data so that it may be converted to generate a visual representation of at least part of the module's content, an image processing set of instructions run by the system may receive (110) image data dimensions which may be used to define an image object's image space when the data is converted. The image processing set of instructions may be written as a second computer program type (for example, in a second computer programming language that is different than the first computer programming language of the software module being developed).

Examples of the second computer program type may include portable document format (PDF) or Adobe® Postscript®. The system may determine based on the unrendered image data a coordinate space which is compatible with the second computer program type so that image data rendered by the method 100 will appear as if it were generated by the first computer program type (but may be altered for scale). In an exemplary embodiment, the step of determining an image coordinate space comprises transforming a first coordinate space associated with the unrendered image data into a second coordinate space defined in the second computer program type. The dimensions may be standardized for any converted data or may be user defined as a pre-step to the conversion. For example, a coordinate space transform may be performed by translating the user coordinate space from the image data into 300 x units and 400 y units. The user coordinate space may be scaled as needed. For example, scaling the user coordinate space by 72 x units and 72 y units generates a one-inch square in the output. For some systems, this may be helpful when generating multiple images from a module so that multiple images rendered may fit onto for example, a single page for quick verification and comparison to each other.

The method 100 may further include the set of instructions determining (120) a bit-per-pixel value to be applied to the unrendered image data. The bit-per-pixel value may be selected based on determining how many bits of image data will fit within the generated image space in the second programming type. This will generate the converted image into an easily identifiable and verifiable image object that appears similar to the expected image output for the software module in the system.

The method 100 may further include using the set of instructions to retrieve (130) the raw, unrendered image data. Under the above image space conditions, the set of instructions may convert (140) the unrendered image data with the applied bit-per-pixel value, into a format readable by the second computer program type. For example, in Postscript®, the retrieved unrendered image data may be converted to the following code:

```
"%!PS
300 400 translate
72 72 scale
8 8 1 [8 0 0 8 0 0] {<aa55>} image
showpage"
```

Figure 2:
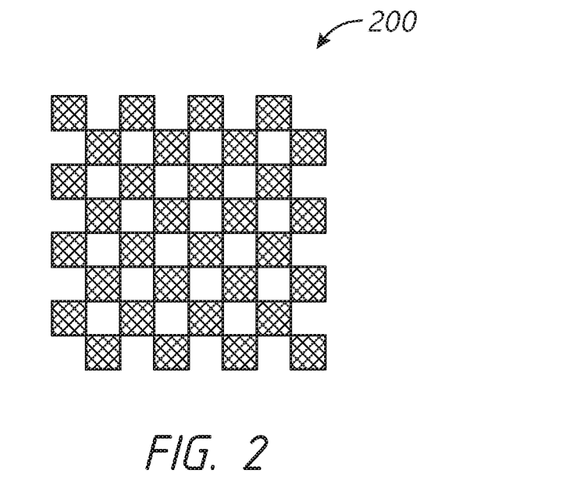
FIG. 2 is a diagram of a rendered image as a product of methods in accordance with embodiments of the subject technology.

As may be appreciated, applying the image operator portion of the above code ("8 8 1 [8 0 0 8 0 0] {<aa55>} image") converts the image data content from the software module code into a format which produces an image object. As will be understood, the image operator used may be defined by the computer program used to convert the code. Once the raw image data is converted, the method 100 may render a visual image object from the converted image data. The rendered visual image object may fill the determined image coordinate space. For example, referring temporarily to FIG. 2, a rendered image object 200 is shown representing the unrendered image data from above. For example, an image operator specifying a one bit-per-pixel image on the image data, with 8 pixels by 8 lines, fills the unit square defined above in the scaled coordinate space with a black and white checkerboard pattern. The rendered visual image object may be displayed for visual verification of the unrendered image data in the software module file. The rendered visual image object may be displayed as a digital object, for example, as a PDF file on a computer workstation screen providing a visual presentation of the image data being transferred across the module interface. This would provide the developer with a better visual representation for the verification process. In some embodiments, displaying the rendered visual image object includes sending the rendered visual image object data to a computer printer port for printing on a computer printer or standalone printer station. In some embodiments, displaying the rendered visual image object is performed on a user interface of an electronic display. As will be appreciated, a user may quickly visually confirm from the generated and displayed image objects whether software modules under development will operate as expected.

Analysis of the image data being passed through the interface may be performed once, but a more likely scenario is that, as development proceeds, the analysis would be performed repeatedly. For this reason, both manual and automated processes may be implemented to continue verification of the software module's content after the initial verification. As the subject software module is modified or other software modules in the system are modified, the system may receive a request (whether manual or automated) to re-verify the image data content of the subject software module.

Figure 3:
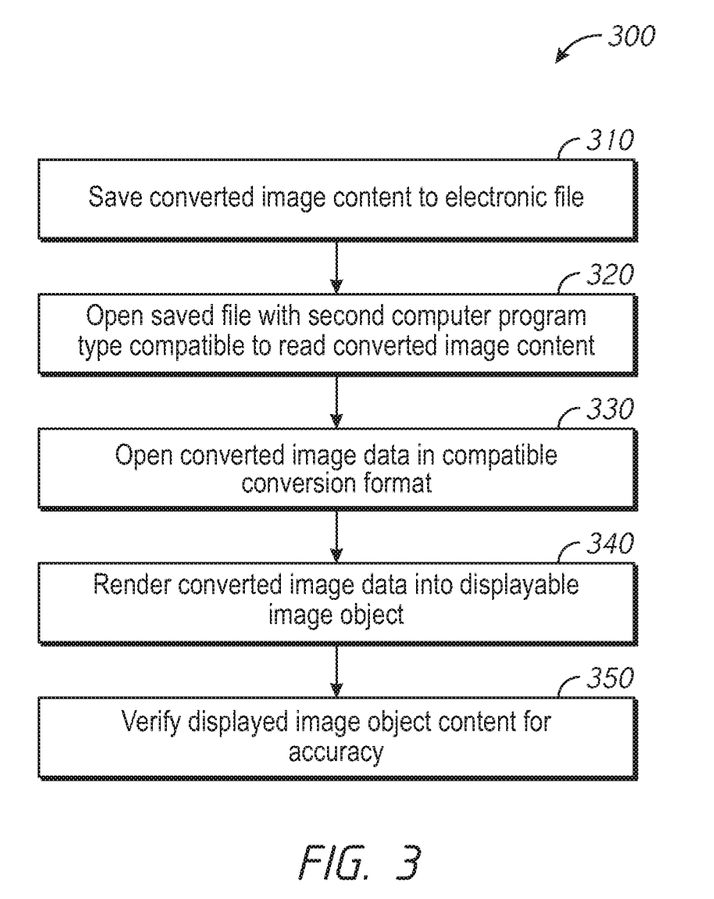
FIG. 3 is a flowchart of a method of manually rendering converted image data into a format for visual verification in accordance with an embodiment of the subject technology.

Referring now to FIG. 3, a manual method 300 of verifying software module image data is shown according to an exemplary embodiment. In one embodiment, converted image data (for example, the image data processed by the method 100) may be stored (310) to an electronic file. In response to a request for verification (or re-verification), the stored file may be opened (320) in an application that is compatible with reading the converted image data in the new converted format (for example, a PDF reader), which is then stored to another disk file. The stored electronic file may then be opened (330) in the converted format and displayed (340) on, for example a computer workstation. The displayed image may be verified (350) for correctness. Embodiments for display may include hard copies printed onto paper from a printing device and soft copies displayed electronically on computing devices including for example printing device displays and other image processors.

Figure 4:
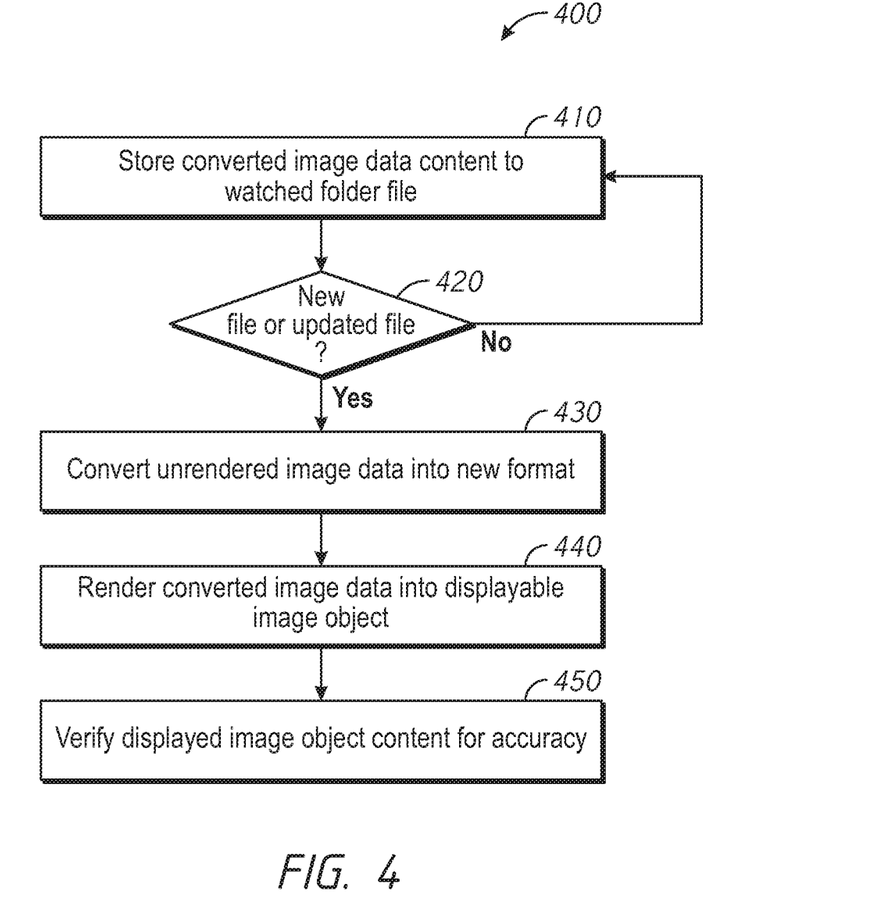
FIG. 4 is a flowchart of a method of automatically rendering converted image data into a format for visual verification in accordance with an embodiment of the subject technology.

Referring now to FIG. 4, a method 400 of automatically verifying software module image data is shown according to an exemplary embodiment. Some embodiments may automate conversion of the captured unrendered image data to the second computer type format to help reduce the time required to perform the conversion and verification over repeated checks of the software module's content within the system. The request for verification may be a user triggered request or an automated request based on for example, an electronic condition being met. For example, if the system registers an update/completion to either the subject software module that contained the original unrendered image content data or to another software module, the system may automatically cross-reference operation of the stored subject software module to see if the other updated/completed software modified the image data content from the stored software module. In one embodiment, converted image data (for example, the image data processed by the method 100) may be stored (410) to an electronic file directory. In an exemplary embodiment, the electronic file directory may be a watched folder (also sometimes referred to as a "watch folder" or "hot folder"). When a file appears in a watched folder (for example, when files from other software modules are added/updated), the method 400 initiates a call that triggers conversion (430) of the captured unrendered image content to the second computer program format (for example, PDF). The resulting PDF file may be opened and displayed (440) for verification. Opening the resultant file may include sending the file to a printer port where it may be printed onto a hard copy and/or displayed on an electronic display. As may be appreciated, as multiple modules may be affected by one module's update in the system or multiple modules may be verified in close time proximity to each other, a user may conveniently retrieve the displayed or printed images and flip through them for easy visual verification.

Figure 5:
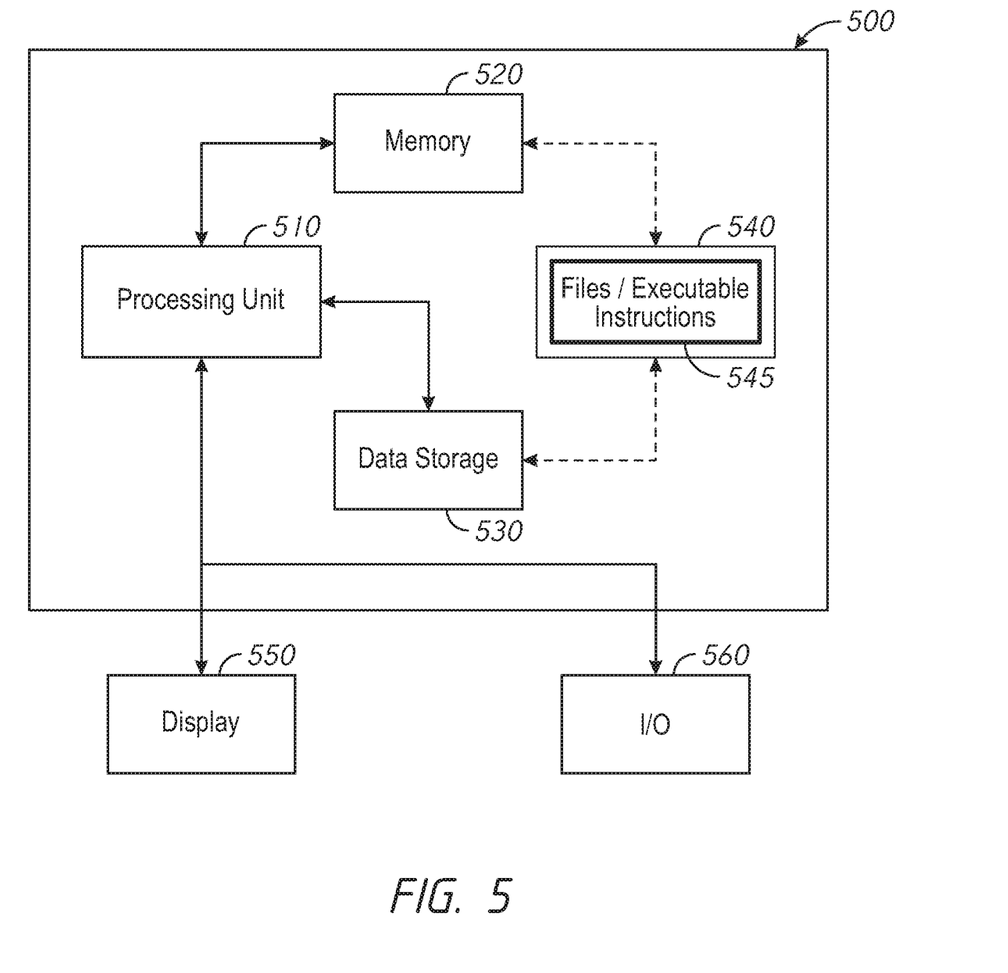
FIG. 5 is a block diagram of a computing device in accordance with an aspect of the subject technology.

Referring now to FIG. 5, a schematic of an example of a computing device 500 is shown. The computing device 500 may be for example, a computer system, a computer server, or a computing based image processing and printing device. As will be appreciated, some aspects of the embodiments disclosed above may turn the computing device 500 into a special purpose computer system. For example, in the role of a host server, the computing device 500 may implement for example the functions of storing electronic files with connected users and their workstations. More particular to this disclosure, as a host server, the computing device 500 may receive and store copies of software modules and coordinate the relationship of each software module to other software modules in the system under development. The computing device 500, as a host server may also store watched folders as described above and may be configured with scripts or other software instructions to recognize when watched folders are updated with new or updated files and to initiate automated processes such as the embodiments described above. In the role of a user device, the computing device 500 is generally not a server but may instead be desktop computers, tablet or laptop computers, all-in-one computer stations, an image processing system (for example, a printer, a fax machine, a copier machine), a mobile computing device (for example, a smart phone, smart wearable devices (glasses, jewelry, watches, ear wear, etc.), or programmable electronics.

The components of the tablet or laptop computers, may include, but are not limited to, one or more processors or processing units 510, a system memory 520, data storage 530, a computer program product 540 having a set of program modules 545 including files and executable instructions, and a bus system that couples various system components including the system memory 520 to the processor(s) 510. In some embodiments, the processors 510 may include a processing unit dedicated to graphics and image processing (for example a graphics processing unit (GPU) or visual processing unit (VPU). As a GPU or VPU, the processor 510 may implement executable instructions focused on image processing applications (like those related to converting unrendered image content data described above) either alone or in coordination with other general processor 510 types such a CPUs, microchips, and the like.

The computing device 500 may be described in the general context of computer system executable instructions, such as the program modules 545 which represent a software embodiment of the system and processes described generally above with respect to FIGS. 1 and 3-4. The program modules 545 generally carry out the functions and/or methodologies of embodiments as described above. As such, while not described in detail, the software modules generally referred to above may be understood to be one example of program modules 545. The computing device 500 may typically include a variety of computer system readable media. Such media could be chosen from any available media that is accessible by the computing device 500, including non-transitory, volatile and non-volatile media, removable and non-removable media for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing. The system memory 520 could include one or more computer system readable media in the form of volatile memory, such as a random-access memory (RAM) and/or a cache memory. By way of example only, the data storage system 530 may read from and write to a non-removable, non-volatile magnetic media device. The system memory 520 may include at least one program product 540 having a set (e.g., at least one) of program modules 545 that are configured to carry out the functions of embodiments of the invention in the form of computer executable instructions. The program product/utility 540, having a set (at least one) of program modules 545, may be stored in the system memory 520 by way of example, and not limitation, as an operating system, one or more application programs, other program modules, and program data.

The computing device 500 may communicate with one or more external devices including for example, an electronic display 550 which may in some embodiments be configured for tactile response as in a touch screen display. User input into the display 550 may be registered at the processor 510 and processed accordingly. Other devices may enable the computing device 500 to communicate with one or more other computing devices, either by hardwire or wirelessly. Such communication can occur via Input/Output (I/O) interfaces/ports 560. In some embodiments, the I/O interfaces/ports 560 may be specially configured to handle aspects of the embodiments described herein converting the computing device 500 into a special purpose machine. For example, as a printer, the I/O interfaces/ports 560 may be configured to transmit receipt of the image data in its converted data format. The printer may be dedicated to the software project under development and image verification may in some be centralized to the printer for visual verification of image object content. The I/O interfaces/ports 560 may also include printing modules (for example, ink jet print heads, laser print systems, etc.) for rendering a physical embodiment of the converted image object in the new format. In another exemplary embodiment, the computing device 500 may be a terminal dedicated to specific programming languages/formats that include an image processing aspect. For example, the computing device 500 may be a workstation or printer that is configured to read, process, and print out data in the form of electronic circuit designs, including for example integrated circuits and very large scale integration (VLSI) designs. VHSIC Hardware Description Language is one example of a format/language in which the processor(s) 510 and/or I/O interfaces/ports 560 may be configured to use to read and process data as it transmitted and received by either element.

The computing device 500, through the I/O interface/ports 560, may communicate with one or more networks such as a local area network (LAN), a general wide area network (WAN), and/or a public network (e.g., the Internet) via a network adapter as is commonly known in the art. Each of the operating system, one or more application programs, other program modules, and program data or some combination thereof, may include an implementation of a networking environment. In some embodiments, the computing device 500 may be a cloud computing node connected to a cloud computing network (not shown). The computer computing device 500 may be practiced in distributed cloud computing environments where tasks are performed by remote processing devices that are linked through a communications network. In a distributed cloud computing environment, program modules may be located in both local and remote computer system storage media including memory storage devices. Thus, members contributing to for example, the overall system being developed described above may provide software modules to the computing device 500 which may hold electronic files and copies in more than one physical location, each of which may be referenced and/or may trigger automated processes once an instance is identified in any of the nodes.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "module", "circuit", or "system." Furthermore, aspects of the disclosed invention may take the form of a computer program product embodied in one or more computer readable media having computer readable program code embodied thereon. In some embodiments, the output of the computer program product provides an electronic user interface on the display 550 which may be controlled via direct contact with the display 550 or via the I/O interfaces 560 (which may be for example, interface devices such as keyboards, touchpads, a mouse, a stylus, or the like).

Aspects of the disclosed invention are described above with reference to block diagrams of methods, apparatus (systems) and computer program products according to embodiments of the invention. It will be understood that each block of the block diagrams, and combinations of blocks in the flowchart illustrations and/or block diagrams, can be implemented by computer program instructions. These computer program instructions may be provided to the processor 510 of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks in the figures.

Those of skill in the art would appreciate that various components and blocks may be arranged differently (e.g., arranged in a different order, or partitioned in a different way) all without departing from the scope of the subject technology. The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects.

Thus, the claims are not intended to be limited to the aspects shown herein, but are to be accorded the full scope consistent with the language of claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A method of verifying image content within a system of software modules, comprising:
   detecting in an electronic file directory, a first software module under development, wherein:
     the first software module under development is part of a system of software modules under development,
     the first software module under development is written in a first format of a first computer program type, and
     the first software module under development includes an added or modified file including unrendered image data written in the first format of the first computer program type, wherein the unrendered image data is configured to be passed between an interface of the first software module under development and a second software module under development;
   automatically triggering running an image processing set of instructions of a second computer program type on the unrendered image data of the first software module under development in response to the first software module under development with the added or modified file being detected in the electronic file directory, the image processing set of instructions configured to:
     determine an image coordinate space compatible with the second computer program type,
     apply a bit-per-pixel value to the unrendered image data of the first software module under development,
     convert, based on an image operator, the unrendered image data with the applied bit-per-pixel value, into a format readable by the second computer program type, and
     render a visual image object from the converted image data, the visual image object filling the determined image coordinate space, wherein the rendered visual image object represents a visual representation of the unrendered image data of the first software module under development to be passed between the interface of the first software module under development and the second software module under development; and
   displaying the rendered visual image object in the format readable by the second computer program type, printed onto a hard copy or displayed on an electronic display, for visual verification of image content of the added or modified file.

2. The method of claim 1, wherein the step of determining an image coordinate space further comprises transforming a first coordinate space associated with the unrendered image data into a second coordinate space defined in the second computer program type.

3. The method of claim 2, wherein the step of determining an image coordinate space further comprises scaling the unrendered image data to fit within the determined image coordinate space.

4. The method of claim 1, wherein the step of displaying the rendered visual image object includes sending the rendered visual image object to a computer printer port for printing on a computer printer or standalone printer station.

5. The method of claim 1, wherein the step of displaying the rendered visual image object is performed on a user interface of an electronic display.

6. The method of claim 1, wherein the image data comprises VHSIC Hardware Description Language.

7. A computer program product for verifying image content within a system of software modules, the computer program product comprising a non-transitory computer readable storage medium having computer readable program code embodied therewith, the computer readable program code being configured to:
   detect in an electronic file directory, a first software module under development, wherein:
     the first software module under development is part of a system of software modules under development,
     the first software module under development is written in a first format of a first computer program type, and
     the first software module under development includes an added or modified file including unrendered image data written in the first format of the first computer program type;
   automatically trigger running an image processing set of instructions of a second computer program type on the unrendered image data of the first software module under development in response to the first software module under development with the added or modified file being detected in the electronic file directory, the image processing set of instructions configured to:
     determine an image coordinate space compatible with the second computer program type,
     apply a bit-per-pixel value to the unrendered image data of the first software module under development, convert, based on an image operator, the unrendered image data with the applied bit-per-pixel value, into a format readable by the second computer program type, and render a visual image object from the converted image data, the visual image object filling the determined image coordinate space, wherein the rendered visual image object represents a visual representation of the unrendered image data of the first software module under development to be passed between the interface of the first software module under development and the second software module under development; and display the rendered visual image object in the format readable by the second computer program type, printed onto a hard copy or displayed on an electronic display, for visual verification of image content of the added or modified file.

8. The computer program product of claim 7, wherein the step of determining an image coordinate space further comprises transforming a first coordinate space associated with the unrendered image data into a second coordinate space defined in the second computer program type.

9. The computer program product of claim 8, wherein the step of determining an image coordinate space further comprises scaling the unrendered image data to fit within the determined image coordinate space.

10. The computer program product of claim 7, wherein the step of displaying the rendered visual image object includes sending the rendered visual image object to a computer printer port for printing on a computer printer or standalone printer station.

11. The computer program product of claim 7, wherein the step of displaying the rendered visual image object is performed on a user interface of an electronic display.

12. The computer program product of claim 7, wherein the image data comprises VHSIC Hardware Description Language.

13. An image rendering computing device, comprising:
a memory module;
an electronic display;
an input/output port; and
a processor in communication with the electronic display, the memory module, and the input/output port, the processor configured, via a set of executable instructions stored in the memory module, to:
detect in an electronic file directory, a first software module under development, wherein:
the first software module under development is part of a system of software modules under development,
the first software module under development is written in a first format of a first computer program type, and
the first software module under development includes an added or modified file including unrendered image data written in the first format of the first computer program type, wherein the unrendered image data is configured to be passed between an interface of the first software module under development and a second software module under development;

automatically trigger running an image processing set of instructions of a second computer program type on the unrendered image data of the first software module under development in response to the first software module under development with the added or modified file being detected in the electronic file directory, the image processing set of instructions configured to:
determine an image coordinate space compatible with the second computer program type,
apply a bit-per-pixel value to the unrendered image data of the first software module under development,
convert, based on an image operator, the unrendered image data with the applied bit-per-pixel value, into a format readable by the second computer program type, and
render a visual image object from the converted image data, the visual image object filling the determined image coordinate space, wherein the rendered visual image object represents a visual representation of the unrendered image data of the first software module under development to be passed between the interface of the first software module under development and the second software module under development; and display the rendered visual image object in the format readable by the second computer program type, printed onto a hard copy or displayed on an electronic display, for visual verification of image content of the added or modified file.

14. The image rendering device of claim 13, wherein the step of determining an image coordinate space by the processor further comprises transforming a first coordinate space associated with the unrendered image data into a second coordinate space defined in the second computer program type.

15. The image rendering device of claim 14, wherein the step of determining an image coordinate space by the processor further comprises scaling the unrendered image data to fit within the determined image coordinate space.

16. The image rendering device of claim 13, further comprising:
the processor forwarding through a network, the rendered visual image object to an electronic file folder flagged for automatic verification; and
displaying on a second computing device, the rendered visual image object from the electronic file folder flagged for automatic verification, in the format readable by the second computer program type.

17. The image rendering device of claim 13, wherein the step of displaying the rendered visual image object includes sending, by the processor, the rendered visual image object to a computer printer port for printing on a computer printer or standalone printer station.

18. The image rendering device of claim 13, wherein the input/output port and/or the processor are configured to read and process the unrendered image data in a VHSIC Hardware Description Language data format.

* * * * *